United States Patent
Hwang

(10) Patent No.: US 9,840,172 B2
(45) Date of Patent: Dec. 12, 2017

(54) MULTIPURPOSE ARMREST FOR VEHICLE

(71) Applicants: HYUNDAI MOTOR COMPANY, Seoul (KR); KIA MOTORS CORPORATION, Seoul (KR)

(72) Inventor: Jin Ho Hwang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 146 days.

(21) Appl. No.: 14/852,354

(22) Filed: Sep. 11, 2015

(65) Prior Publication Data

US 2016/0107550 A1 Apr. 21, 2016

(30) Foreign Application Priority Data

Oct. 17, 2014 (KR) ........................ 10-2014-0140464

(51) Int. Cl.
- *A47C 7/62* (2006.01)
- *B60N 2/46* (2006.01)
- *B60N 3/00* (2006.01)
- *B60N 3/10* (2006.01)

(52) U.S. Cl.
CPC ......... *B60N 2/4686* (2013.01); *B60N 2/4646* (2013.01); *B60N 3/002* (2013.01); *B60N 3/101* (2013.01); *A47C 7/62* (2013.01); *B60N 3/106* (2013.01)

(58) Field of Classification Search
CPC .......... B60N 2/4686; B60N 3/106; A47C 7/62
USPC ...... 297/154, 155, 150, 145, 188.14–188.17, 297/411.37; 296/24.34, 37.8; 108/44
See application file for complete search history.

(56) References Cited

U.S. PATENT DOCUMENTS

| | | | | |
|---|---|---|---|---|
| 6,086,129 A * | 7/2000 | Gray | ...................... | B60K 37/00 296/37.8 |
| 7,147,280 B2 * | 12/2006 | Duerr | .................. | B60N 2/4686 297/112 |
| 7,431,365 B2 * | 10/2008 | Sturt | .................... | B60N 2/4686 224/539 |
| 8,235,567 B2 * | 8/2012 | Hipshier | ................ | B60Q 3/225 362/154 |
| 2007/0018493 A1 * | 1/2007 | Kawachi | ................ | B60K 37/06 297/411.37 |

(Continued)

FOREIGN PATENT DOCUMENTS

| | | |
|---|---|---|
| JP | 2000-255324 A | 9/2000 |
| JP | 2002-096686 A | 4/2002 |
| JP | 2012165933 A * | 9/2012 |

(Continued)

*Primary Examiner* — Syed A Islam

(74) *Attorney, Agent, or Firm* — McDermott Will & Emery LLP

(57) ABSTRACT

A multipurpose armrest for a vehicle includes: a console box mounted on a guide rail to be slidable forward and backward along the guide rail; an armrest mounted on the top of the console box to be openable or closable; push buttons mounted on the top of the console box; tables mounted on both sides of the console box to be horizontally unfolded at the time of pressing the push buttons; and table locking devices mounted on both sides of the console box to interlock with the push buttons to lock and closely fix the tables onto both side surfaces of the console box at the time of keeping table or horizontally unfold the table at the time of using the table.

12 Claims, 4 Drawing Sheets

(56) References Cited

U.S. PATENT DOCUMENTS

2008/0290680 A1  11/2008  Busha et al.

FOREIGN PATENT DOCUMENTS

| KR | 10-2004-0097970 A | 11/2004 |
| KR | 10-2007-0076324 A | 7/2007 |
| KR | 10-2010-0120453 A | 11/2010 |
| KR | 10-2012-0020918 A | 3/2012 |

\* cited by examiner

MULTIPURPOSE ARMREST FOR VEHICLE

CROSS-REFERENCE TO RELATED APPLHICATION

This application claims priority under 35 U.S.C. §119(a) to and the benefit of Korean Patent Application No. 10-2014-0140464 filed on Oct. 17, 2014 in the Korean Intellectual Property Office, the entire contents of which are incorporated herein by reference.

TECHNICAL FIELD

The present disclosure relates to a multipurpose armrest for a vehicle, and more particularly, to a multipurpose armrest for a vehicle which may provide various functions as well as an armrest function.

BACKGROUND

An armrest for a vehicle may be mounted on a console box installed between a driver seat and a passenger seat to be openable or closable, or may be installed between left and right seats of a rear seat.

In general, as the console box is fixedly installed, the armrest thereon is fixedly installed at a predetermined location to be used for purposes of an armrest and a storage space, but since a location to rest an arm may vary depending on a body condition of a user, some users may feel inconvenient.

Therefore, a structure that can slidably move the console box having the armrest to a desired location is disclosed in US Patent Application Publication No 2008/029068.

However, there is convenience that a user can use the console box having the armrest by slidably moving the console box to the desired location, but as the location of the armrest is just changed, there is a disadvantage that the console box cannot be used for various purposes.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art and to provide a multipurpose armrest for vehicle with a new structure, which can slidably move an armrest forward and backward together with a console box and use the arm for various purposes including purposes of a cup holder and a simple table.

In one aspect, the present invention provides a multipurpose armrest for a vehicle, including: a console box mounted on a guide rail to be slidable forward and backward along the guide rail; an armrest mounted on the top of the console box to be openable or closable; push buttons mounted on the top of the console box; tables mounted on both sides of the console box to be horizontally unfolded at the time of pressing the push buttons; and table locking devices mounted on the both sides of the console box to interlock with the push buttons to lock and closely fix the tables onto the both side surfaces of the console box at the time of keeping table or horizontally unfold the table at the time of using the table.

In a preferred embodiment, a memo holder and a light lamp may be mounted on an inner surface of the armrest.

In another preferred embodiment, a tray and a cup holder may be formed on the top of the console box.

In still another preferred embodiment, the table locking device may include a table operating lever that is provided in a structure in which a pressed end which contacts the push button mounted on the top of the console box is formed at one end of the table operating lever and a hook is formed at the other end of the table operating lever and an intermediate portion is hinge-mounted on the side surface of the console box, a hook groove formed on an inner surface of the table in a structure in which the hook is lockable and insertable, and a stopper coaxially fixed and mounted on a hinge shaft of the table operating lever to limit a rotational angle of the table operating lever.

In yet another embodiment, an oil damper that constantly controls an unfolding speed of the table may be further mounted on a rotational shaft of the table.

In still yet another preferred embodiment, when the table is horizontally unfolded, a table supporting device for supporting a horizontal state of the table may be further mounted on the bottom of the table and between the both sides of the console box.

In a further another preferred embodiment, the table supporting device may include a support bar of which one end is hinge-joined onto an inner surface of the table, and a support bar holding box having a structure in which a sliding hole through which the other end of the support bar slidably moves formed in the support bar holding box and a lock groove into which the other end of the support bar is locked and inserted is formed on one-end bottom of the sliding hole.

In another aspect, the present invention provides a multipurpose armrest for a vehicle, including: a console box movable along a guide rail; foldable tables mounted on opposite sides of the console box; and an armrest rotatable along an edge of the console box.

The armrest may include a memo holder and a light lamp mounted on an inner surface of the armrest. The inner surface of the armrest may be a surface facing the console box when the armrest covers the console box.

The console box may include a tray and a cup holder are formed on the top of the console box.

The multipurpose armrest may further include: push buttons, mounted on the top of the console box, for enabling the foldable tables to be folded; and table locking devices, mounted on the opposite sides of the console box, for interlocking with the push buttons to unfold the foldable tables.

The table locking device may include: a table operating lever including a pressed end, which is coupled to one of the push buttons, disposed at one end of the table operating lever, a hook disposed at the other end of the table operating lever, and an intermediate portion hinge-mounted on the side surface of the console box, a hook groove formed on the inner surface of the table in a structure in which the hook is lockable and insertable, and a stopper coaxially fixed and mounted on a hinge shaft of the table operating lever to limit a rotational angle of the table operating lever.

The multipurpose armrest may further include an oil damper, which constantly controls an unfolding speed of the table, mounted on a rotational shaft of the table.

Through the aforementioned problem solving means, the present invention provides the following effects.

First, the armrest can be slidably moved forward and backward together with the console box and can be used for various purposes including the purposes of the cup holder and the simple table.

Second, the simple table can be selectively unfolded to the left side or the right side to enable left and right passengers to easily use the table.

Third, the cup holder and a tray are provided on the top of the console box to provide convenience in which food and drink can be taken at the time of using the table.

Fourth, when the armrest is opened, lighting and a memo holder are exposed to use the table and easily make a memory even at night.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (for example, fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1A:
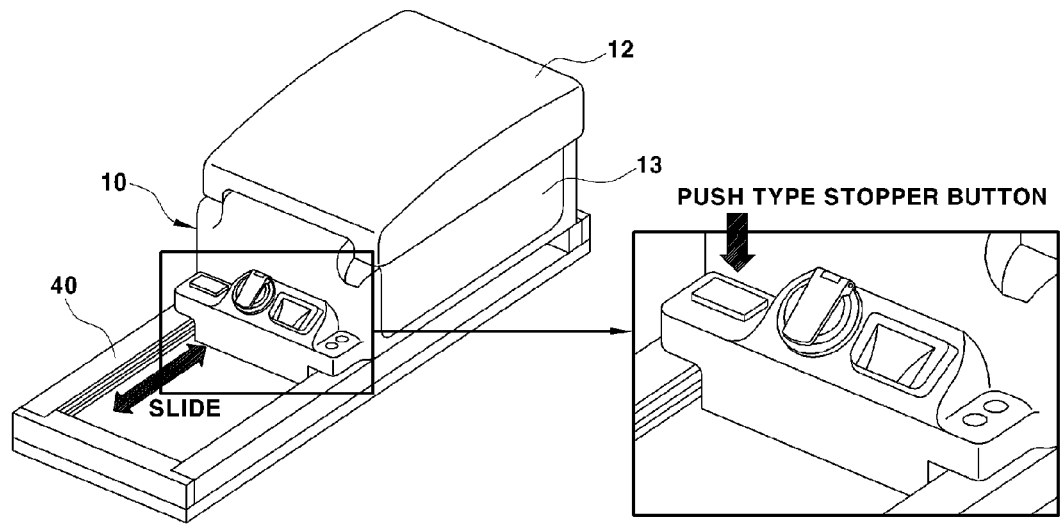
FIGS. 1A and 1B are perspective views illustrating a multipurpose armrest for a vehicle according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, a preferred embodiment of the present invention will be described in detail with reference to the accompanying drawings.

According to an aspect of the present disclosure, an armrest may be slidably moved forward and backward together with a console box and may provide various purposes such as installation of a folding type table at the side of the console.

Figure 1B:
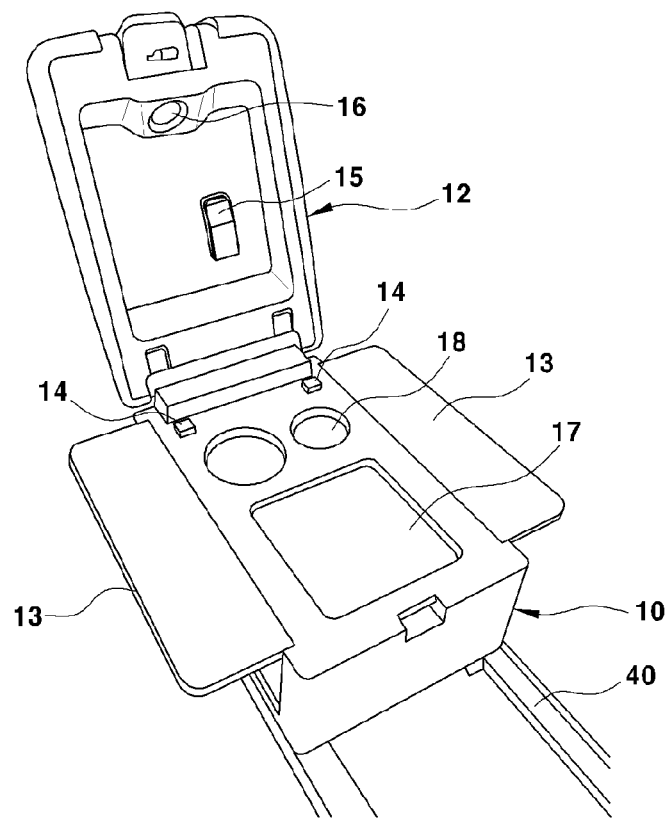
Figure 2:
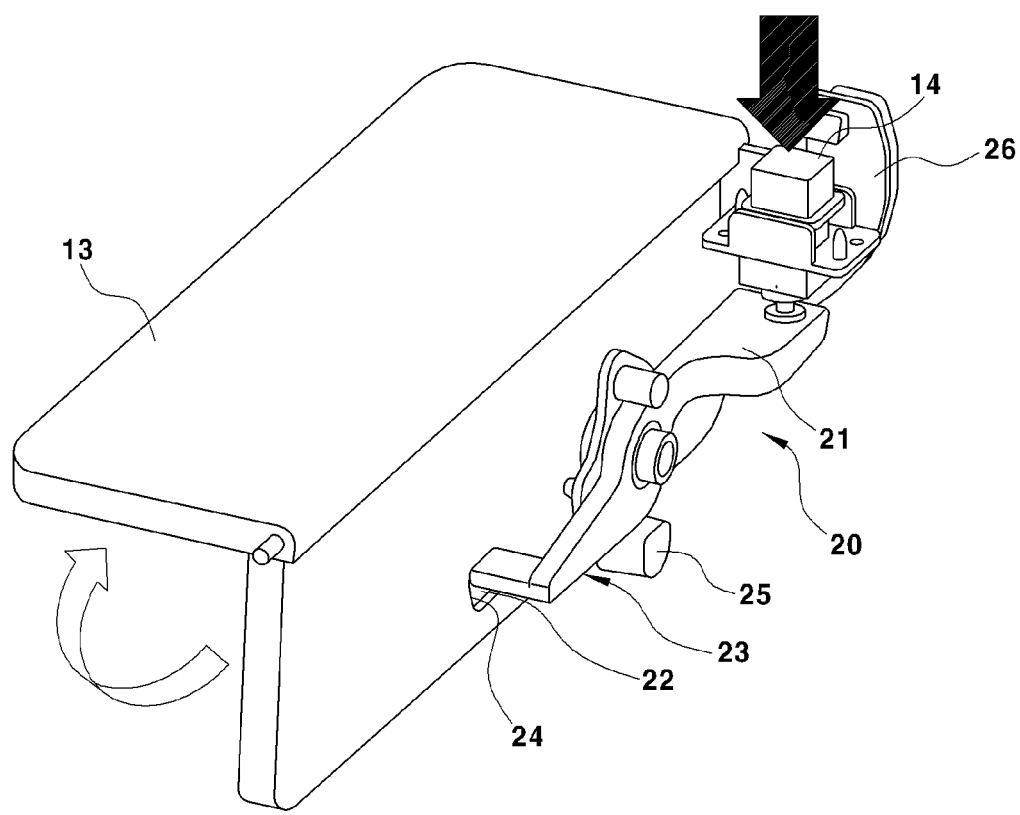
FIG. 2 is a perspective view illustrating a table locking device of the multipurpose armrest for a vehicle according to the embodiment of the present invention.

FIGS. 1A and 1B are perspective views illustrating a multipurpose armrest for a vehicle according to an embodiment of the present invention. FIG. 2 is a perspective view illustrating a table locking device of the multipurpose armrest for a vehicle according to the embodiment of the present invention In FIGS. 1A and 1B, reference numeral 40 represents a guide rail mounted on a floor panel of a vehicle.

The guide rail 40 as a path for moving a console box 10 forward and backward is fixedly mounted on a floor panel between a left seat and a right seat, or at one side of a seat.

Therefore, the console box 10, mounted on the guide rail 40, is able to slidably move forward and backward.

For example, a generally rail structure is formed, in which the bottom of the console box 10 is seated on the guide rail 40, and as a result, the console box 10 may move forward and backward along the guide rail 40.

As illustrated in FIG. 1A, a general one-touch push type stopper button that falls when being pressed once and rises when being pressed once again is mounted on a predetermined portion of the console box 10. When the stopper button is pressed, a hook (not illustrated) shape unit formed at a lower end of the button is suspended to a rail groove (not illustrated) of the guide rail 40 to fix the console box at a desired location.

In this case, an armrest 12 is mounted on the top of the console box 10 to be openable or closable, and as a result, a memo holder 15 and a lighting lamp 16 are mounted on the inner surface of the armrest 12. The armrest 12 may be opened or closed by rotating along a hinge installed at a boundary of the armrest 12 and the console box 10.

A tray 17 and a cup holder 18 are formed on the top of the console box 10.

The lighting lamp 16 may be automatically or manually turned on when the armrest 12 is opened at night, and as a result, a table, the cup holder, and the like may be conveniently used as well as the memo holder even at night.

Meanwhile, push buttons 14 for unfolding tables 13 are mounted on the top of the console box 10 and the tables 13 to be unfolded horizontally at the time of pressing the push buttons 14 are mounted at both sides of the console box 10.

In particular, table locking devices 20 which may interlock with the push buttons 14 are mounted on both sides of the console box 10, and as a result, the table locking devices 20 serve to unfold the tables 13 horizontally from both sides of the console box 10 at the time of using the tables or lock and closely fix the tables 13 on both side surfaces of the console box 10 at the time of keeping the tables.

To this end, a table operating lever 23 that interlocks with the push button 14 among components of the table locking device 20 is hinge-mounted on the side surface of the console box 10.

Figure 3:
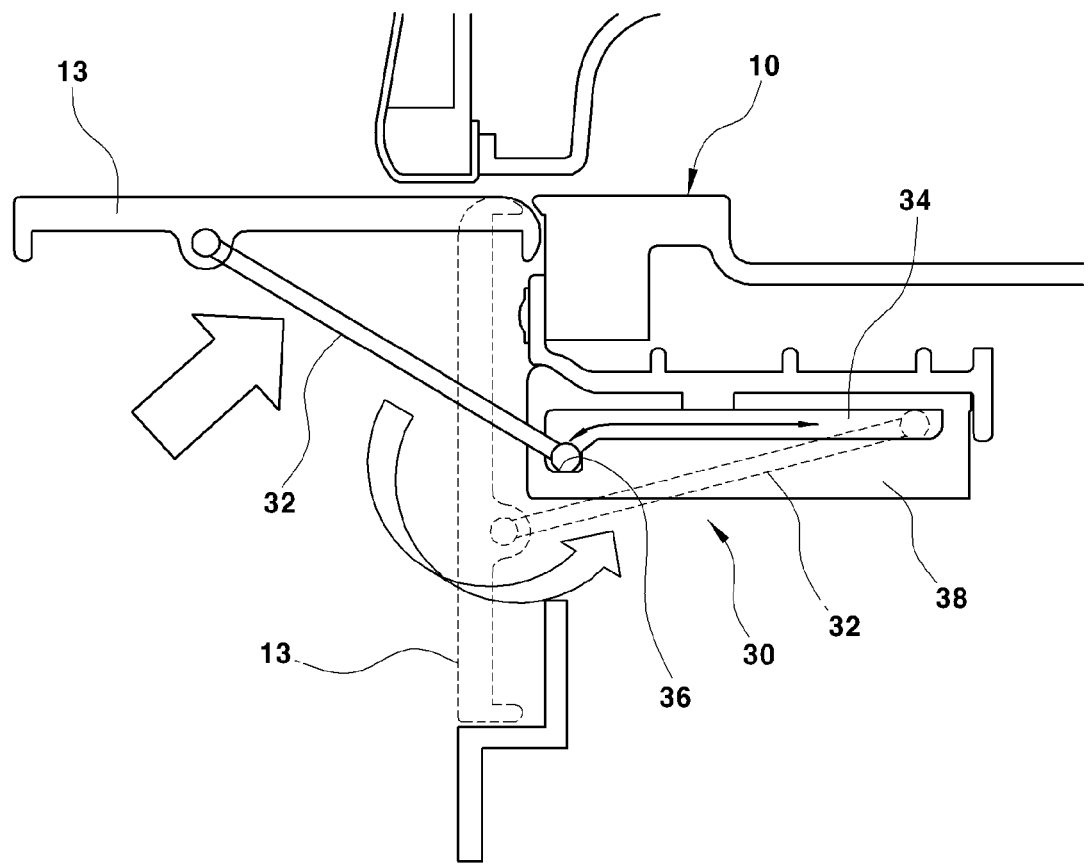
FIG. 3 is a cross-sectional view illustrating a table supporting device of the multipurpose armrest for a vehicle according to the embodiment of the present invention.
Figure 4:
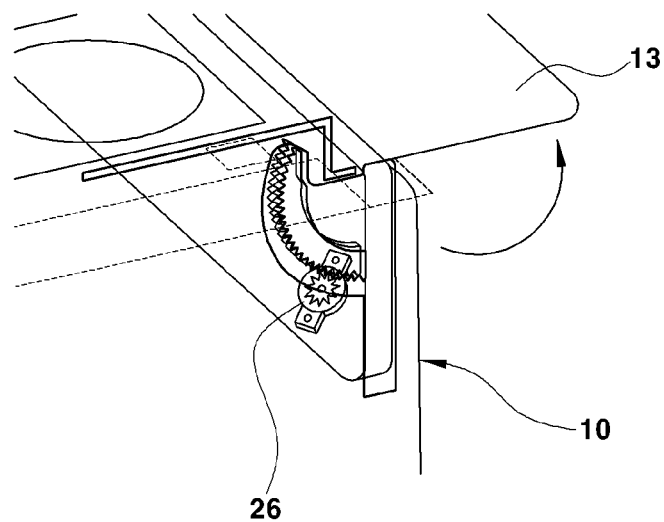
FIG. 4 is a perspective view of a main part illustrating a damper providing damping force at the time of unfolding a table of the multipurpose armrest for a vehicle according to the embodiment of the present invention.

In more detail, as illustrated in FIG. 3, the table operating lever 23 includes a pressed end 21, which may contact the bottom of the push button 14 mounted on the top of the console box 10, formed at one end of the table operating lever 23, a hook 22 for locking the table formed at the other end of the table operating lever 23, and an intermediate portion mounted on the side surface of the console box 10 to angularly rotate by a friction hinge.

In this case, a hook groove 24 into which the hook 22 of the table operating lever 23 may be locked and inserted is formed on the inner surface of the table 13.

For example, when the hook 22 of the table operating lever 23 is formed in an "L" shape, the hook groove 24 of the table 13 is also formed in the "L" shape. As a result, when the hook 22 falls simultaneously with being inserted into the hook groove 24, the table 13 is locked, and when the hook 22 that falls rises to be separated from the hook groove 24, the table 13 is unlocked.

Preferably, a stopper 25 is coaxially fixed and mounted on a hinge shaft of the table operating lever 23 as illustrated in FIG. 3 to limit a rotational angle of the table operating lever 23.

Since a table supporting device 30 is mounted between the bottom of the table 13 and both sides of the console box 10, the table supporting device 30 serves to support a horizontal state of the table when the table 13 is horizontally unfolded.

To this end, one end of a support bar 32 that rests the table 13 among components of the table supporting device 30 is hinge-joined onto the inner surface of the table 13.

A sliding hole 34 through which the other end of the support bar 32 slidably moves is formed in the console box 10 and a support bar holding box 38 with a lock groove 36 is incorporated in one-end floor of the sliding hole 34.

Therefore, while one end of the support bar 32 is hinge-joined onto the bottom of the table 13, the other end of the support bar 32 is positioned at the sliding groove 34 of the support bar holding box 38 when the table 13 is folded and locked and inserted into the lock groove 36 when the table 13 is unfolded.

Meanwhile, an oil damper 26 that constantly controls a folding speed of the table is mounted on a rotational shaft of the table 13.

Herein, a usage state of the multipurpose armrest for a vehicle of the present invention configured as above will be described below.

Figure 5:
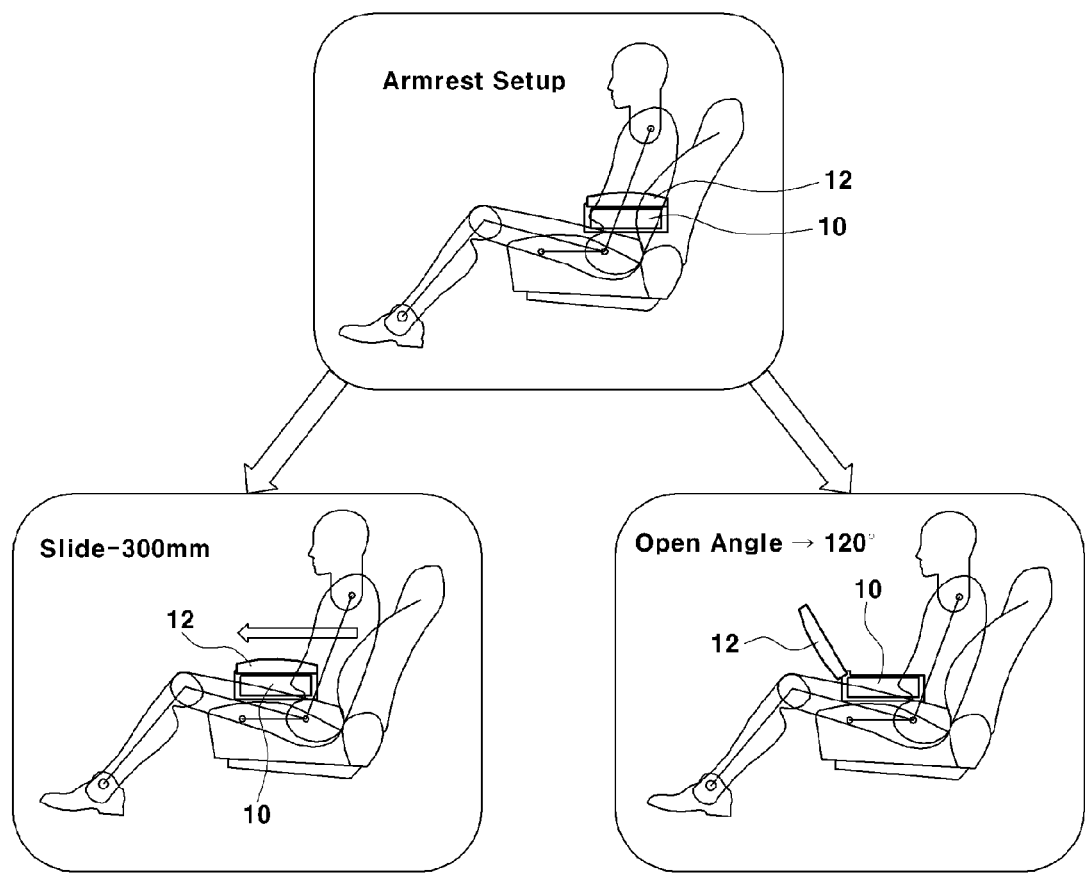
FIG. 5 is a side view illustrating a usage state of the multipurpose armrest for a vehicle according to the embodiment of the present invention.

First, as illustrated in FIG. 5, a user slides the console box 10 forward or backward to a desired location, that is, a location according to a body condition thereof along the guide rail 40.

Subsequently, by bending back and opening the armrest 12 mounted on the top of the console box 10, the tray 17 and the cup holder 18 formed on the top of the console box 10 are exposed and simultaneously, the memo holder 15 and the lighting lamp 16 formed in the armrest 12 are exposed.

Therefore, the user may conveniently use the memo holder 15 simultaneously with using the tray 17 and the cup holder 18. The user may turn on the lighting lamp 16 at night to conveniently use the table, the cup holder, and the like as well as the memo holder.

In this case, when the user intends to use the table 13 by folding the table 13 toward the front thereof, the user presses the push button 14 mounted on the top of the console box 10.

Therefore, as illustrated in FIG. 3, a lower end of the push button presses a pressed end 21 of the table operating lever 23, and as a result, the table operating lever 23 angularly rotates around a hinge point in the middle thereof and subsequently, the hook 22 of the table operating lever 23 matches the hook groove 24 of the table 13, and as a result, the table 13 is unlocked.

Thus, the table 13 is unfolded from the side surface of the console box 10 at a predetermined speed by rising force of the oil damper 26 and unfolded horizontally at one side of the console box 10 in the state where the user may use the table 13.

In this case, the support bar 32 of the table supporting device 30 is locked and inserted into the lock groove 36 of the support bar holding box 38, and as a result, the support bar 32 sturdily supports the horizontal state of the table 13.

Meanwhile, when the user intends to fold the table 13, the support bar 32 is ejected from the lock groove 36 by lifting up the support bar 32 and subsequently, the table 13 is pressed, the support bar 32 moves along the sliding hole 34 of the support bar holding box 38 and the table 13 is in close contact with the side surface of the console box 10.

Subsequently, the hook 22 of the table operating lever 23 is inserted into the hook groove 24 of the table 13 while the push button 14 is pressed and thereafter, when the push button 14 is released, the hook 22 falls simultaneously with being inserted into the hook groove 24, and as a result, the table 13 is locked.

As described above, the armrest 12 may slidably move forward and backward together with the console box 10 and used for various purposes including the purposes of the cup holder and the simple table, and in particular, the table may be selectively unfolded to the left side or the right side of the console box, and as a result, left and right passengers may be conveniently use the table.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A multipurpose armrest for a vehicle, comprising:
   a console box mounted on a guide rail to be slidable forward and backward along the guide rail;
   an armrest mounted on the top of the console box to be openable or closable;
   push buttons mounted on the top of the console box;
   tables mounted on both sides of the console box to be horizontally unfolded upon pressing the push buttons; and
   table locking devices mounted on the both sides of the console box to interlock with the push buttons to lock and closely fix the tables onto the both side surfaces of the console box at the time of keeping tables or horizontally unfold the tables at the time of using the tables.

2. The multipurpose armrest of claim 1, wherein the armrest includes a memo holder and a light lamp mounted on an inner surface thereof.

3. The multipurpose armrest of claim 1, wherein the console box includes a tray and a cup holder on the top of the console box.

4. The multipurpose armrest of claim 1, wherein the table locking device includes:
   a table operating lever including a pressed end, which contacts one of the push buttons, disposed at one end of the table operating lever, a hook disposed at the other end of the table operating lever, and an intermediate portion hinge-mounted on the side surface of the console box, a hook groove formed on an inner surface of the table in a structure in which the hook is lockable and insertable, and a stopper coaxially fixed and mounted on a hinge shaft of the table operating lever to limit a rotational angle of the table operating lever.

5. The multipurpose armrest of claim 1, further includes an oil damper, which constantly controls an unfolding speed of the table, mounted on a rotational shaft of the table.

6. The multipurpose armrest of claim 1, wherein when the table is horizontally unfolded, a table supporting device for supporting a horizontal state of the table is further mounted on the bottom of the table and between the both sides of the console box.

7. The multipurpose armrest of claim 6, wherein the table supporting device includes:
   a support bar of which one end is hinge-joined onto an inner surface of the table, and
   a support bar holding box having a structure in which a sliding hole through which the other end of the support bar slidably moves formed in the support bar holding box and a lock groove into which the other end of the support bar is locked and inserted is formed on one-end bottom of the sliding hole.

8. A multipurpose armrest for a vehicle, comprising:
   a console box movable along a guide rail;
   foldable tables mounted on opposite sides of the console box;
   an armrest rotatable along an edge of the console box;
   push buttons, mounted on the top of the console box, for enabling the foldable tables to be folded; and
   table locking devices, mounted on the opposite sides of the console box, for interlocking with the push buttons to unfold the foldable tables.

9. The multipurpose armrest of claim 8, wherein the armrest includes a memo holder and a light lamp mounted on an inner surface of the armrest, and
   wherein the inner surface of the armrest is a surface facing the console box when the armrest covers the console box.

10. The multipurpose armrest of claim 8, wherein the console box includes a tray and a cup holder are formed on the top of the console box.

11. The multipurpose armrest of claim 8, wherein the table locking device includes:
   a table operating lever including a pressed end, which is coupled to one of the push buttons, disposed at one end of the table operating lever, a hook formed at the other end of the table operating lever, and an intermediate portion hinge-mounted on a side surface of the console box,
   a hook groove disposed on an inner surface of the table in a structure in which the hook is lockable and insertable, and
   a stopper coaxially fixed and mounted on a hinge shaft of the table operating lever to limit a rotational angle of the table operating lever.

12. The multipurpose armrest of claim 8, further including an oil damper, which constantly controls an unfolding speed of the table, mounted on a rotational shaft of the table.

* * * * *